(12) United States Patent
Yoshizawa

(10) Patent No.: US 6,577,991 B1
(45) Date of Patent: Jun. 10, 2003

(54) RECORDABLE METHOD OF PROCESSING FIGURE

(75) Inventor: Keiji Yoshizawa, Nagano (JP)

(73) Assignee: Shinko Electric Industries Co., Ltd., Nagano (JP)

(*) Notice: Subject to any disclaimer, the term of this patent is extended or adjusted under 35 U.S.C. 154(b) by 0 days.

(21) Appl. No.: 09/492,924

(22) Filed: Jan. 28, 2000

(30) Foreign Application Priority Data

Jan. 29, 1999 (JP) .......................................... 11-022326

(51) Int. Cl.[7] .......................... G06G 7/48; G06F 17/50; G06T 17/00; G03F 9/00
(52) U.S. Cl. ............................ 703/6; 716/19; 345/428; 430/5
(58) Field of Search ................................ 703/1, 2, 3, 7, 703/14, 6; 345/428; 430/5; 716/19

(56) References Cited

U.S. PATENT DOCUMENTS

| | | | | |
|---|---|---|---|---|
| 4,945,497 A | * | 7/1990 | Malachowsky et al. | ...... 345/428 |
| 6,051,344 A | * | 4/2000 | Langston et al. | ............... 430/5 |
| 6,200,710 B1 | * | 3/2001 | Hada | ............................... 430/5 |

FOREIGN PATENT DOCUMENTS

JP            404052770 A  *  2/1992  ........... G06F/15/60

OTHER PUBLICATIONS

Huang, Yen–Son and Chan, Shu–Park. "A Graph–Theoretic Approach to the IC Layout Resizing Problem". IEEE Transactions on Circuits and System. vol. 27, Issue 5, pp. 380–391. 1980.*

Okubo, Tsuneo et al., "New Algorithm for Overlapping Cell Treatment in Hierarchical CAD Data / Electron Beam Exposure Data Conversion". Conference Proceedings on 27th ACM/IEEE Design Automation Conference, pp. 321–326. 1991.*

Sharir, Micha and Sivan Toledo. "Extremal Polygon Containment Problems". Computational Geometry Theory and Applications, vol. 4, pp. 99–118. 1994.*

* cited by examiner

Primary Examiner—Hugh Jones
Assistant Examiner—Ayal I. Sharon
(74) Attorney, Agent, or Firm—Pennie & Edmonds LLP

(57) ABSTRACT

A method of processing a figure and a recorded medium are used to obtain an enlarged figure or a reduced figure by moving the sides of a polygon, which is composed by putting a plurality of horizontal trapezoids upon each other, each of the trapezoids having upper and lower sides parallel to the X-axis, in the direction of the Y-axis to the outside or inside of the polygon in parallel with each other. The method comprises the steps of: selecting an objective horizontal trapezoid, extracting first, second and third groups of segments regarding the objective, lower and upper horizontal trapezoids, creating new first, second and third groups of segments moved to outside or inside of the polygon, removing unnecessary groups of segments, sorting the contact point and the division point, drawing parallel lines parallel to X-axis from the contact and division points, and storing the contact and division points included in the parallel line.

6 Claims, 7 Drawing Sheets

BROKEN LINE TO SOLID LINE: PLUS SIZING PROCESS
SOLID LINE TO BROKEN LINE: MINUS SIZING PROCESS

RECORDABLE METHOD OF PROCESSING FIGURE

BACKGROUND OF THE INVENTION

1. Field of the Invention

The present invention relates to a method of processing a figure and a recorded medium. More particularly, the present invention relates to a method of processing a figure in which a mask pattern is subjected to a resizing processing which includes an enlarging processing and a reducing processing, when LSI (large-scale integrated package) is manufactured by means of CAD (Computer Aided Design).

2. Description of the Related Art

In the mask data conversion system in which CAD data of an LSI is converted into data for exposure (manufacture), sizing processing is provided, which is referred to as "resizing processing" in some cases, in which an outer circumference of figure P of a mask pattern (mask figure) is enlarged by a predetermined value (enlarging processing or plus sizing processing) and reduced (reducing or minus sizing processing), as shown in FIG. 7. This sizing processing is performed for the purpose of correction so that deformation caused in the manufacturing process can be corrected and also for the purpose of correction conducted according to a change in the designing rule.

Usually, in the data conversion system for converting mask pattern data in the case of manufacturing an LSI, in order to avoid carrying out complicated processing, mask pattern P composed of a polygon is divided into a plurality of horizontal trapezoids (trapezoids A and B, the upper sides and the lower sides of which are parallel with axis X) as shown in FIG. 8, and sizing processing and other various figure processing, such as AND, OR, XOR, NOT, SUB and so forth, are conducted on the basis of these horizontal trapezoids. In this connection, the concept of a "horizontal trapezoid" includes a figure, the length of the upper side or the lower side of which is zero, that is, the concept of a "horizontal trapezoid" includes a "triangle".

As shown in FIG. 9, it is assumed that the sizing processing, which is one of the aforementioned figure processing, is conducted and horizontal trapezoids A and B defining mask pattern P expressed by one polygon are individually resized. In the case of a reducing (minus) processing, concerning horizontal trapezoids A' and B' which are adjacent to each other, the upper side of the reduced horizontal trapezoids A' and the lower side of the reduced horizontal trapezoid B' are separated from each other, so that a slit is formed between the two horizontal trapezoids A' and B'. In the case of an enlarging (plus) processing, corners of horizontal trapezoids A' and B', which have been enlarged, stick out from the regions of the adjacent horizontal trapezoids.

Therefore, according to the conventional resizing processing, the horizontal trapezoids defining one polygon are once composed into the polygon itself, and resizing processing is conducted on the polygon itself.

However, the efficiency is low in the case of the aforementioned processing in which the divided horizontal trapezoids are once composed into a polygon each time of sizing processing and then new horizontals trapezoids are formed after the completion of sizing processing.

SUMMARY OF THE INVENTION

The present invention has been accomplished to solve the above problems. It is an object of the present invention to provide a method of processing a figure capable of conducting a resizing processing on a mask pattern expressed by a set of horizontal trapezoids without once composing the horizontal trapezoids into a polygon.

In order to solve the above problems, the present invention provides a method of processing a figure for obtaining an enlarged, figure or a reduced figure by moving the sides of a polygon, which is composed by putting a plurality of horizontal trapezoids upon each other, each of the trapezoids having upper and lower sides parallel to X-axis, in the direction of Y-axis to the outside or inside of the polygon in parallel with each other, the method of processing a figure comprising the steps of:
selecting the horizontal trapezoid one by one along Y-axis out of the plurality of horizontal trapezoids as an objective horizontal trapezoid;

extracting a first group of segments included in the sides composing the objective horizontal trapezoid and also composing the sides of the polygon, also extracting a second group of segments included in an upper side and right and left sides of a lower horizontal trapezoid and composing the sides of the polygon if there is such a lower horizontal trapezoid coming into contact with the lower side of the objective horizontal trapezoid, also extracting a third group of segments included in the side of an upper horizontal trapezoid which is a side coming into contact with the objective horizontal trapezoid and composing the sides of the polygon if there is such an upper horizontal trapezoid coming into contact with an upper side of the objective horizontal trapezoid;

creating a new first group of segments, a new second group of segments and a new third group of segments, if the first group of segments, the second group of segments and the third group of segments are respectively moved to the outside or inside of the polygon in parallel with each other and also if an extension line located outside the polygon or a segment after the completion of movement is removed on the basis of an intersection point of the extension line of the segment composing each group of segments which has been moved in parallel or on the basis of an intersection point of the segment composing each group of segments which has been moved in parallel;

removing the new third group of segments after the intersection point of the new first group of segments and the new second group of segments and the intersection point of the new first group of segments and the new third group of segments are stored as contact points and also removing the new second group of segments on the lower side of a division point if the predetermined division point exists on the new second group of segments;

sorting the contact point and the division point in the order of the Y coordinate value and the X coordinate value under the condition that priority is given to Y coordinate value;

drawing parallel lines parallel to X-axis from the contact point and the division point, in the order of sorting, to the inside of the polygon while it is being detected whether or not points of intersection exist between the new second group of segments and the parallel line or between the new first group of segments and the parallel line and also making a horizontal trapezoid encircled by the parallel line, the new first group of segments and the new second group of segments to be a new horizontal trapezoid composing the enlarged figure or the reduced figure if the points of intersection exist; and storing the contact point and the point of intersection included in the parallel line, the Y-coordinate value of which is the highest in the parallel line on which the point of intersection exists, instead, of the division point if the upper horizontal trapezoid exists.

According to the method of processing a figure of the present invention, a mask pattern, which is a polygon expressed by a set of horizontal trapezoids, can be subjected to resizing processing without once synthesizing the horizontal trapezoids into a polygon. Therefore, it is unnecessary to conduct such processing that the horizontal trapezoids are once synthesized into a polygon each time of the processing of resizing and they are formed into new horizontal trapezoids after the completion of the processing of resizing. Accordingly, the process of resizing can be effectively carried out.

BRIEF DESCRIPTION OF THE DRAWINGS

As shown in FIG. 2, wherein FIG. 3(a) is a view showing a state in which the second step of FIG. 1 is carried out, FIG. 3(b) is a schematic illustration for explaining the third step of FIG. 1, FIG. 3(c) is a view showing a state in which the fourth step of FIG. 1 is carried out and FIG. 3(d) is a view showing a state in which a new horizontal trapezoid is created;

FIGS. 4(a) to 4(d) are schematic illustrations for explaining the processing of a figure conducted on horizontal trapezoid B shown in FIG. 2, wherein FIG. 4(a) is a view showing a state in which the second step of FIG. 1 is carried out, FIG. 4(b) is a schematic illustration for explaining the third step of FIG. 1, FIG. 4(c) is a view showing a state in which the fourth step of FIG. 1 is carried out and FIG. 4(d) is a view showing a state in which a new horizontal trapezoid is created;

FIGS. 5(a) to 5(d) are schematic illustrations for explaining the processing of a figure conducted on horizontal trapezoid C, wherein FIG. 5(a) is a view showing a state in which the second step of FIG. 1 is carried out, FIG. 5(b) is a schematic illustration for explaining the third step of FIG. 1, FIG. 5(c) is a view showing a state in which the fourth step of FIG. 1, is carried out and FIG. 5(d) is a view showing a state in which a new horizontal trapezoids created;

DETAILED DESCRIPTION OF THE INVENTION

Figure 1:
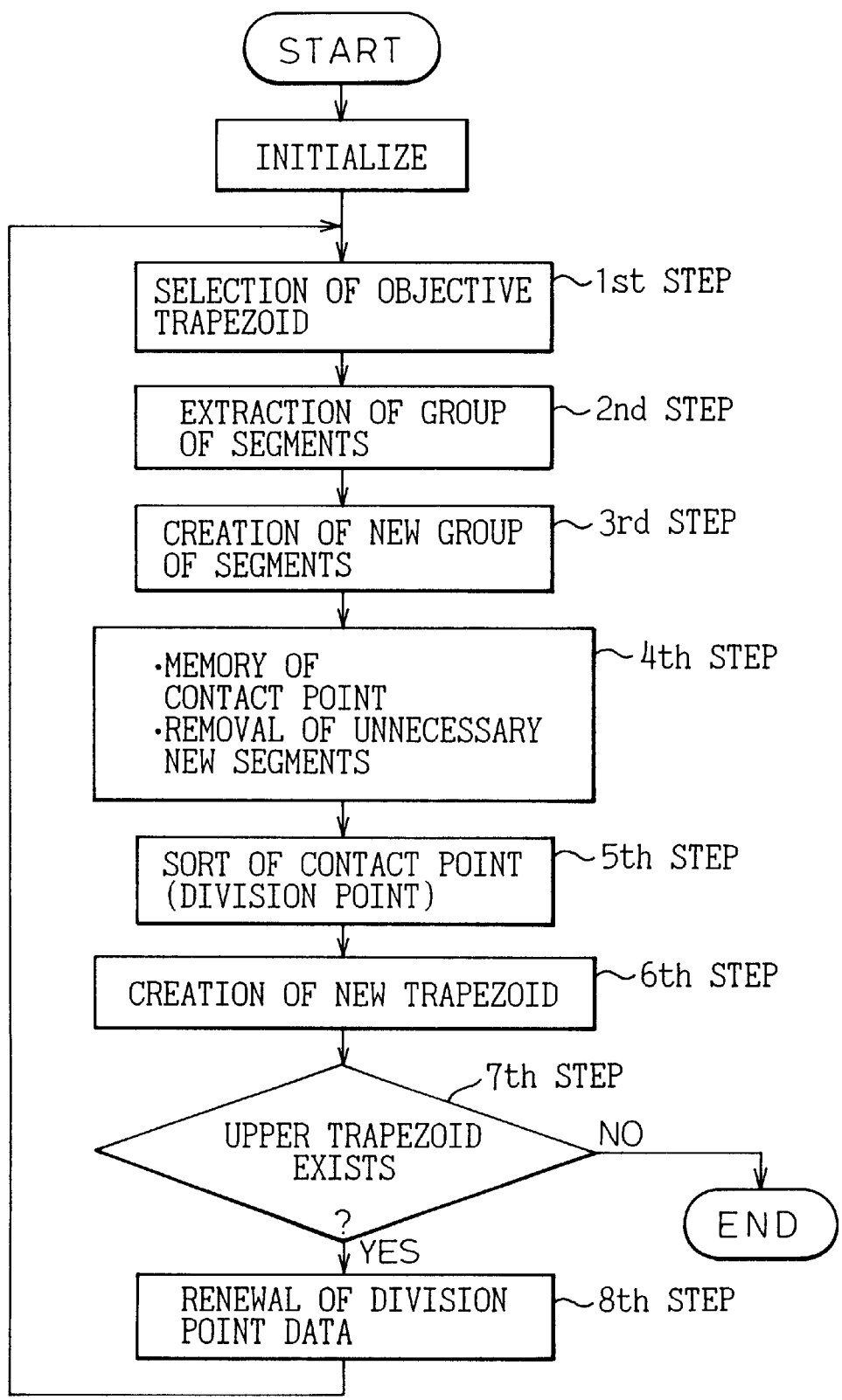
FIG. 1 is a flow chart showing a basic action of a method of processing a figure according to the present invention.
Figure 2:
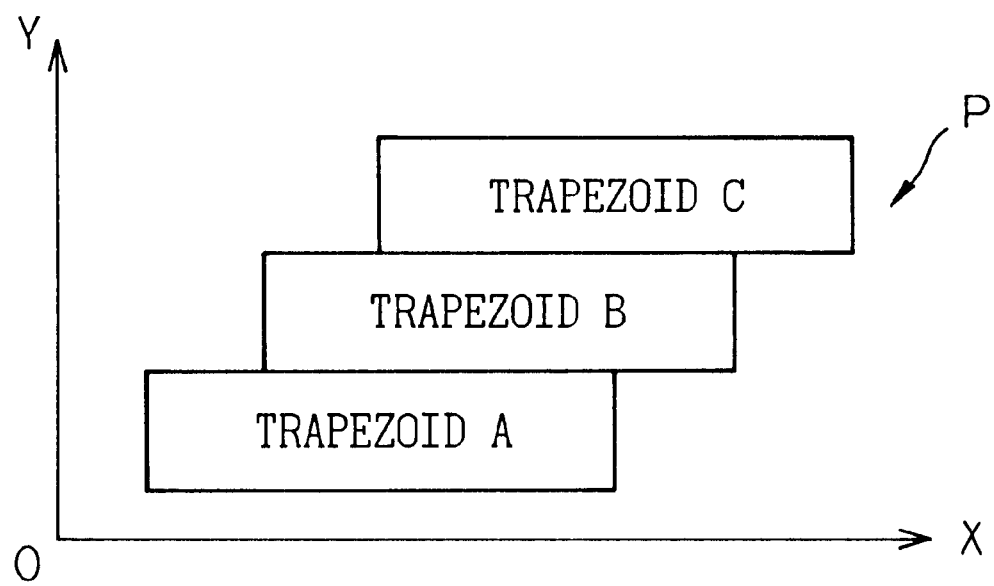
FIG. 2 is a schematic illustration for explaining polygon X, which is subjected to sizing processing by the method of processing a figure shown in FIG. 1, and also for explaining a plurality of horizontal trapezoids composing polygon X.

Referring now to the appended drawings, a most preferred embodiment of the method of processing a figure according to the present invention will be explained as follows. In this embodiment, an example of polygon P, which is composed of three trapezoids A, B and C, as shown in FIG. 2, will be referred. However, it should be noted that the method of processing a figure of the present invention can be applied to a case in which the number of trapezoids is two or not less than four. Also, the method of processing a figure of the present invention can be applied to a case in which the polygon is composed of one trapezoid.

IN THE CASE OF OBTAINING AN ENLARGED FIGURE

Referring to FIGS. 1 to 6, explanations will be made into a case in which an enlarged figure is obtained from a polygon.

First of all, initial setting is conducted, in which each memory region of a memory section (not shown) in which the group of segments, contact points and division points are respectively stored is initialized, so that no groups of segments, contact points and division points are stored in the memory section.

Next, the first step is conducted as follows. As shown in FIG. 2, three horizontal trapezoids A, B and C, which compose one polygon P, are successively selected one by one in the direction of Y-axis (from the lower portion to the upper portion in FIG. 2), so that the thus, selected horizontal trapezoid is made to be an "objective horizontal trapezoid". In this embodiment, the horizontal trapezoids are successively selected in the order of horizontal trapezoids A, B and C. Therefore, first of all, horizontal trapezoid A becomes an objective horizontal trapezoid.

In the second step, the first group of segments are extracted which are included in the sides composing the selected objective horizontal trapezoid and compose the sides of polygon P. Depending upon an objective horizontal trapezoid, there is a case in which a lower horizontal trapezoid comes into contact with the lower side of this objective horizontal trapezoid. In this case, the second group of segments are also extracted which are included in the upper side and the right and left sides of the lower horizontal trapezoid and also compose the sides of the polygon. Depending upon an objective horizontal trapezoid, there is a case in which an upper horizontal trapezoid comes into contact with the upper side of this objective horizontal trapezoid. In this case, the third group of segments are also extracted which are included in the side of the upper horizontal trapezoid, the side comes into contact with the objective horizontal trapezoid, and which also compose the sides of the polygon.

At first, the objective horizontal trapezoid is horizontal trapezoid A. Therefore, only an upper horizontal trapezoid B exists. Therefore, the first and the third group of segments are extracted.

Figure 3A:
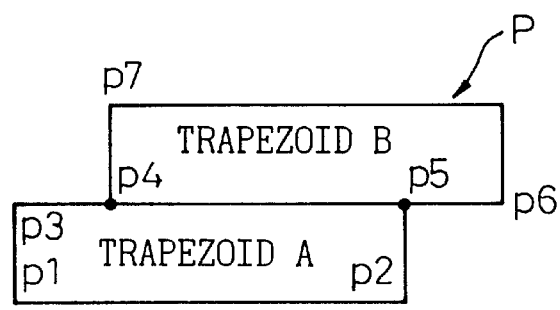
FIGS. 3(a) to 3(d) are schematic illustrations for explaining the processing of a figure conducted on horizontal trapezoid.

The details are described as follows. As shown in FIG. 3(a), the first group of segments are the sides composing horizontal trapezoid A, and also composing the sides of polygon P, that is, the first group of segments are (p5, p2), (p2, p1), (p1, p3) and (p3, p4).

The third group of segments are the sides composing horizontal trapezoid B, the lower side of which comes into contact with the upper side of horizontal trapezoid A, and also composing the sides of polygon P, that is, the third group of segments are (p6, p5) and (p4 p7).

In this connection, "contact of two sides" includes both line contact of two sides and point contact of two sides.

In the third step, polygon P is enlarged. Therefore, the first, the second and the third group of segments are respectively moved outside polygon P in parallel. Then, the new first, the new second and the new third group of segments are created in such a manner that extension lines located outside polygon P on the basis of the points of intersection of the extension lines of the segments composing each group of segments, which have been moved in parallel, are removed.

Figure 3B:
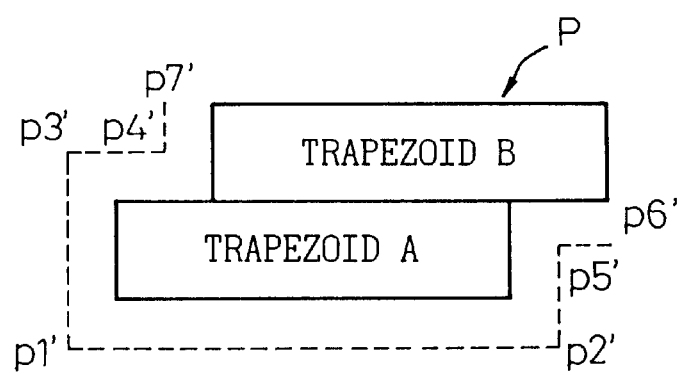

When the objective horizontal trapezoid is horizontal trapezoid A, as shown in FIG. 3(b), the first group of segments (p5,p2), (p2, p1), (p1, p3) and (p3, p4) and the third group of segments (p6, p5) and (p4, p7), which have been extracted in the second step, are moved outside polygon P in parallel, and extension lines located outside polygon P on the basis of the points of intersection of the segments composing each group of segments are removed. Due to the foregoing, the new first group of segments (p5', p2'), (p2', p1'), (p1', p3') and (p3', p4') and the new third group of segments (p6,', p5') and (p4', p7'), which correspond to the first and the third group of segments, are created.

In the fourth step, the point of intersection of the new first group of segments and the new second group of segments and the point of intersection of the new first group of segments and the new third group of segments are stored as contact points. After that, the new third group of segments are removed, and at the same time, when a predetermined division point exists on the new second group of segments, the new second group of segments on the lower side of the division point are removed, that is, the new second group of segments on the side, the Y-coordinate value of which is small, are removed.

Figure 3C:
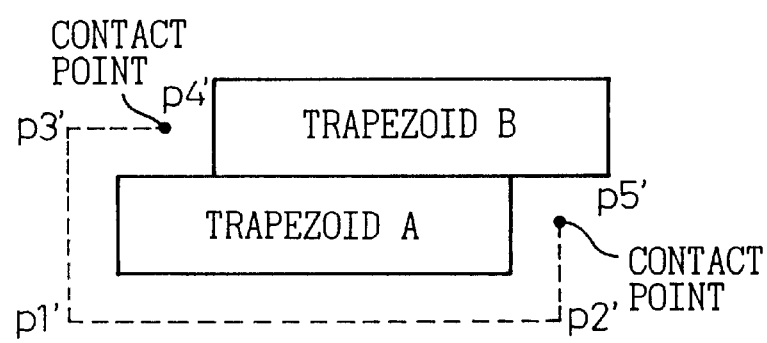

Specifically, as shown in FIG. 3(c), the intersection points p4', p5' of the new first and the new third group of segments are stored as contact points. After that, the new third group of segments (p6', p5') and (p4', p7') are removed. In this connection, if the objective horizontal trapezoid is horizontal trapezoid A, the new second group of segments do not exist. Therefore, removal of the new second group of segments is not conducted.

In the fifth step, the contact points, which include division points if the division points exist, are sorted in the order of the Y-coordinate value and the X-coordinate value under the condition that priority is given to the Y-coordinate Value.

Specifically, p4' and p5' are stored as contact points, and no division points still exist. Therefore, the objects to be sorted are contact points p4' and p5'.

These two contact points are sorted in the order of the Y-coordinate value and the X-coordinate value under the condition that priority is given to the Y-coordinate value {P5', P4'}.

In the sixth step, parallel lines, which are parallel with X-axis are successively drawn from the contact point and the division point to the inside of polygon P in the order of sorting while it is being detected whether or not points of intersection exist between the new second group of segments and the parallel line and also between the new first group of segments and the parallel lines. If the points of intersection exist, a horizontal trapezoid encircled by the parallel line, the new first and the new second group of segments is stored as a new horizontal trapezoid composing an enlarged figure.

Figure 3D:
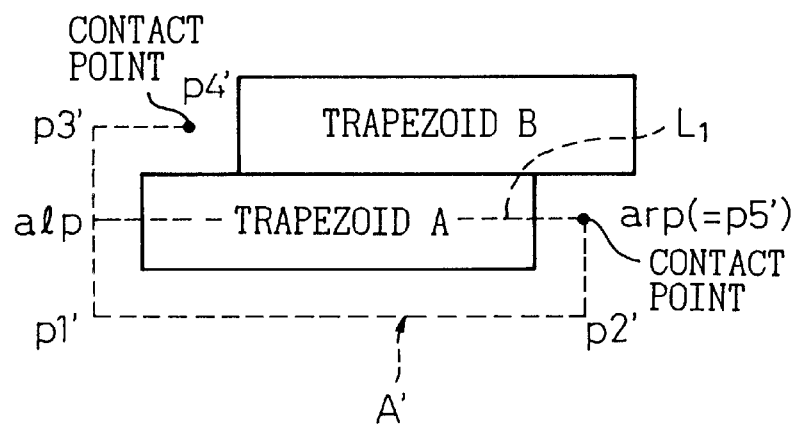

Specifically, as shown in FIG. 3(d), first, parallel line $L_1$ is drawn from the contact point p5'. Then, a point of intersection (alp) exists between this parallel line $L_1$ and the segment (p1', p3') composing the new first group of segments. Therefore, horizontal trapezoid A' encircled by parallel line $L_1$ and the new first group of segments (p5', p2'), (p1', p1') and (p1', p3') is stored as one of the new horizontal trapezoid composing the enlarged figure.

Next, a parallel line is drawn from the contact point p4'. In this case, no point of intersection exists between the parallel line and the new first group of segments. Therefore, a new horizontal trapezoid is only horizontal trapezoid A' when the objective horizontal trapezoid is horizontal trapezoid A.

In the seventh step, it is checked whether or not an upper horizontal trapezoid exists.

In the case where the upper horizontal trapezoid exists, that is, in the case where there is a horizontal trapezoid to be processed exists, the program is transferred to the eighth step, and the contact point and the intersection point included in the parallel line, the Y-axis coordinate value of which is the highest among the parallel lines having intersection points, are stored as division points, and the program is returned to the first step and the processing is continued. In this connection, in the case where the division points have already been stored, these contact point and intersection point are stored as new division points instead of the division points which have already been stored. That is, the content of the memory region in which the coordinate data of the division points is stored is renewed.

On the other hand, if there is no upper horizontal trapezoid in the seventh step, the processing is completed with respect to all the horizontal trapezoids composing polygon P. Therefore, the sizing processing is finished.

Specifically, in the case where the objective horizontal trapezoid is horizontal trapezoid A, horizontal trapezoid B exists as an upper horizontal trapezoid. Therefore, the program is transferred to the eighth step, and the division point is renewed. In this case, the number of parallel lines is only one and the line is parallel line $L_1$. The contact point p5' and the intersection point (alp) included in this parallel line $L_1$ are stored as division points. These division points are upper end points of the right and the left sides of the new horizontal trapezoid A'. Therefore, they can be a left side division point alp and a bright side division point arp (=p5') of the new horizontal trapezoid A'.

In this way, creating processing of the new horizontal trapezoid with respect to horizontal trapezoid A selected as an objective horizontal trapezoid is completed.

After that, the first to the eighth steps described above are carried out while the objective horizontal trapezoid is successively changed, and a new horizontal trapezoid such as a horizontal trapezoid A' is successively created for each objective horizontal trapezoid. This successive creation of the new horizontal trapezoid is continued until the horizontal trapezoids composing polygon P are completed.

The thus newly created horizontal trapezoids are horizontal trapezoids composing an enlarged figure (resized figure) obtained when each side of polygon P is moved outside polygon P in parallel.

After horizontal trapezoid A has been processed as described above, since horizontal trapezoid B exists as an upper horizontal trapezoid, the program is returned to the first step, and the same processing as that of horizontal trapezoid A is conducted while horizontal trapezoid B is set at an objective horizontal trapezoid.

Figure 4A:
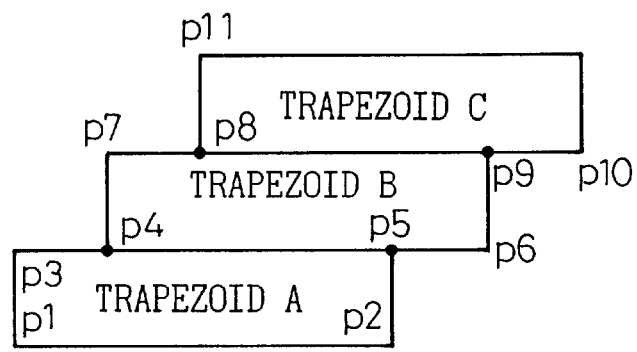

As shown in FIG. 4(a), the first group of segments, (p9, p6), (p6, p5), (p4, p7) and (p7, p8) are extracted in the second step. Concerning horizontal trapezoid B, there is a lower horizontal trapezoid (horizontal trapezoid A) coming into contact with the lower side of horizontal trapezoid B.

The second group of segments are extracted and are included in the upper, the right and the left side of this lower horizontal trapezoid A and compose the sides of a polygon. In this case, the second group of segments are (p4, p3), (p3, p1) and (p5, p2). Concerning horizontal trapezoid B, there is an upper horizontal trapezoid (horizontal trapezoid C) coming into contact with the upper side of horizontal trapezoid B. Therefore, the third group of segments are extracted and are included in the side of this upper horizontal trapezoid C, the side coming into contact with the objective horizontal trapezoid, wherein the third group of segments compose the sides of polygon P. In this case, the third group of segments are (p10, p9) and (p8, p11).

Figure 4B:
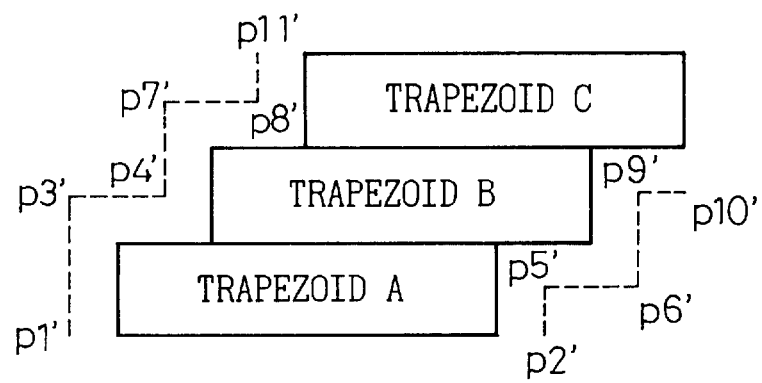

Since polygon P is enlarged in the third step, as shown in FIG. 4(b), the first group of segments (p9, p6), (p6, p5), (p4, p7) and (p7, p8), the second group of segments (p4, p3), (p3, p1) and (p5, p2) and the third group of segments (p10, p9) and (p8, p11) are moved outside polygon P. Extension lines located outside polygon P are removed on the basis of the points of intersection of the segments composing the groups of segments which have been moved-in-parallel. Corresponding to the groups of segments, the new first group of segments (p9', p6'), (p6', p5'), (p4', p7') and (p7', p8'), the new second group of segments (p4', p3'), (p3', p1') and (p5', p2') and the new third group of segments (p10', p9') and (p8', p11') are created.

Figure 4C:
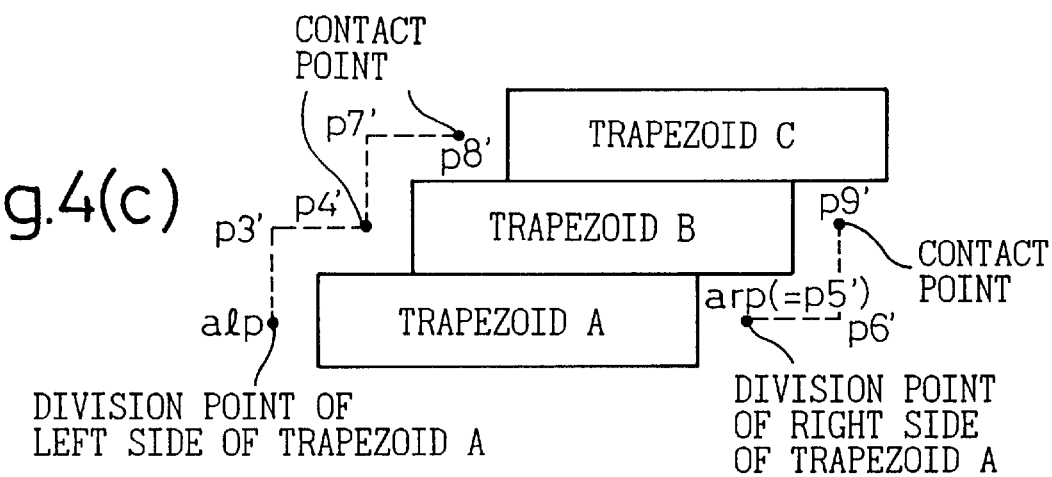

As shown in FIG. 4(c), in the fourth step, the points of intersection (p5', p4') of the first group of, segments and the second group of segments and the points of intersection (p8', p9') of the first group of segments and the third group of segments are stored as contact points, and then the new third group of segments (p10', p9') and (p8', p11') are removed. Since the division points alp and arp (=p5') exist on the new second group of segments, the new second group of segments, which are lower than these division points, are removed. Specifically, the segments (alp, p1'), (p5', p2') in the new second group of segments (p4', p3'), (p3', p1') and (p5', p2') are removed.

In the fifth step, the contact points (including the division points if the division points exist) found in the above step are sorted in the order to the Y-coordinate value and the X-coordinate value under the condition that priority is given to the Y-coordinate value. In the case of horizontal trapezoid B, there are contact points (p5', p4' and p8', p9') and division points (alp and arp (=p5')). Therefore, these five points (p5', p4' and p8', p9' and alp) are the objects to be sorted.

These points are sorted in the order of the Y-coordinate value and the X-coordinate value under the condition that priority is given to the Y-coordinate value. In this way, {alp, arp, p4', p9', p8'} are provided.

In the sixth step, parallel lines which are parallel with the X-axis are successively drawn from the contact points and the division points in the direction to the inside of polygon P in the order of sorting while it is being detected whether or not a point of intersection exists between the new second group of segments or the new first group of segments and the parallel lines. In the case where a point of intersection exists, a horizontal trapezoid encircled by the parallel lines, the new first group of segments and the new second group of segments are stored as a horizontal trapezoid composing the enlarged figure.

Figure 4D:
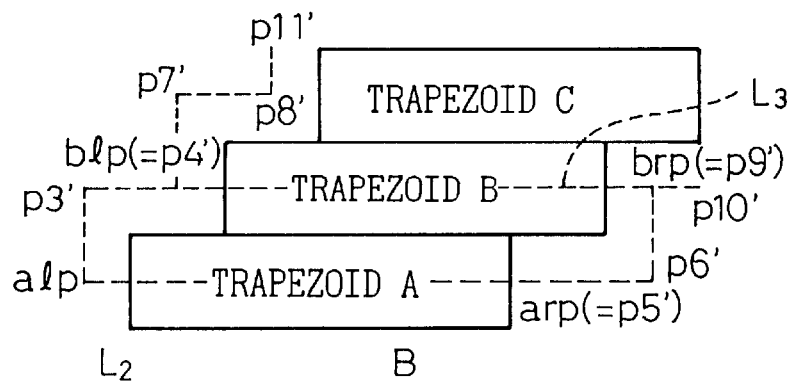

As shown in FIG. 4(d), in the case of horizontal trapezoid B, parallel line $L_2$ drawn from division point alp first crosses the segment (p6', p5') in the new first group of segments at the point p5'. Parallel line $L_3$ drawn from the contact point p4' crosses the segment (p9', p6') in the new first group of segment at the point p9'. Therefore, horizontal trapezoid B', which is encircled by the two parallel lines $L_2$, $L_2$, the new second group of segments (alp, p3'), (p3', p4') and the new first group of segments (p9', p6'), (p6', p5'), is stored as a new horizontal trapezoid.

In the seventh step, if the objective horizontal trapezoid is horizontal trapezoid B, it is detected that upper horizontal trapezoid C exists. Therefore, the program transfers to the eighth step, and the contact point and the intersection point included in parallel line $L_2$, the Y-coordinate value of which is the highest among parallel lines $L_1$, $L_2$ on which the intersection points exist, are renewed as division points and stored. Due to the foregoing, new division points are blp (=p4') and brp (=p9'). These division points are upper end points of the right and the left side of new horizontal trapezoid B'. In this case, blp (=p4') is a left side division point of new horizontal trapezoid, and brp (p9') is a right side division point of new horizontal trapezoid.

Next, the program returns to the first step, and the next horizontal trapezoid is made to be an objective horizontal trapezoid.

The objective horizontal trapezoid is horizontal trapezoid C.

Figure 5A:
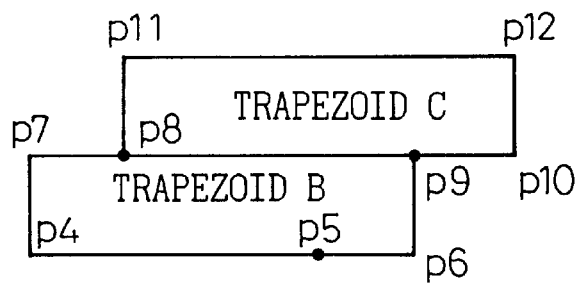
Figure 5B:
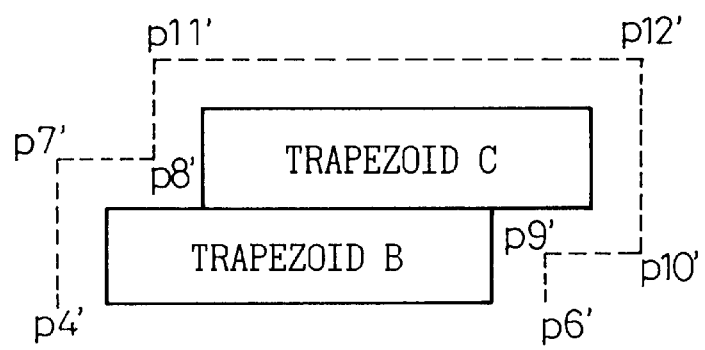

As shown in FIG. 5(a), in the second step, the first group of segments (p8, p11), (p11, p12), (p12, p10) and (p10, p9) are extracted. Concerning horizontal trapezoid C, there is a lower horizontal trapezoid (horizontal trapezoid B) coming into contact with the lower side of horizontal trapezoid C. Therefore, the second group of segments are extracted which are included in the upper side, the right side and the left side of lower horizontal trapezoid B and compose the sides of the polygon. In this case, the second group of segments are (p4, p7), (p7, p8) and (p6, p9). Concerning horizontal trapezoid B, there is no upper horizontal trapezoid coming into contact with the upper side of horizontal trapezoid B. Therefore, the third group of segments do not exist.

In the third step, since polygon P is enlarged, the first group of segments (p8, p11), (p11, p12), (p12, p10) and (p10, p9) and the second group of segments (p4, p7), (p7, p8) and (p6, p9) are moved outside polygon P. Extension lines located outside polygon P are removed on the basis of the points of intersection of the segments composing the groups of segments which have been moved in parallel. Corresponding to the groups of segments shown in FIG. 5(b), the new first group of segments (p8', p11'), (p11', p12'), (p12', p10') and (p10', p9') and the new second group of segments (p4', p7'), (p7', p8') and (p6', p9') are created.

Figure 5C:
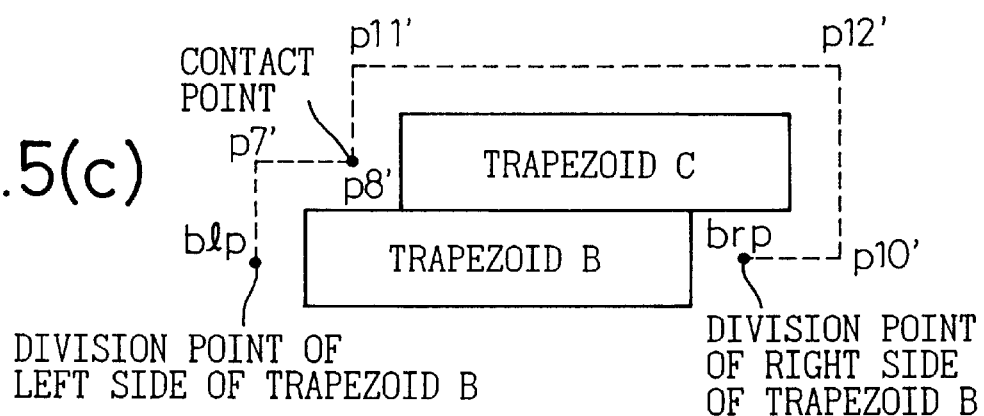

As shown in FIG. 5(c), in the fourth step, the point of intersection p8' of the first group of segments and the second group of segments are stored as a contact point. Since the division points blp, brp (=p9') exist on the new second group of segments, the new second group of segments, which are lower than these division points, are removed. Specifically, the segments (blp, p4'), (p9', p6') in the new second group of segments are removed.

In the fifth step, the contact points (including the division points) found in the above step are sorted in the order of the Y-coordinate value and the X-coordinate value under the condition that priority is given to the Y-coordinate value. In this way, {blp, brp, p8'} are provided.

In the sixth step, parallel lines which are parallel with the X-axis are successively drawn from the contact points and the division points in the direction of the inside of polygon P in the order of sorting while it is being detected whether or not a point of intersection exists between the new second group of segments or the new first group of segments and the parallel lines.

Figure 5D:
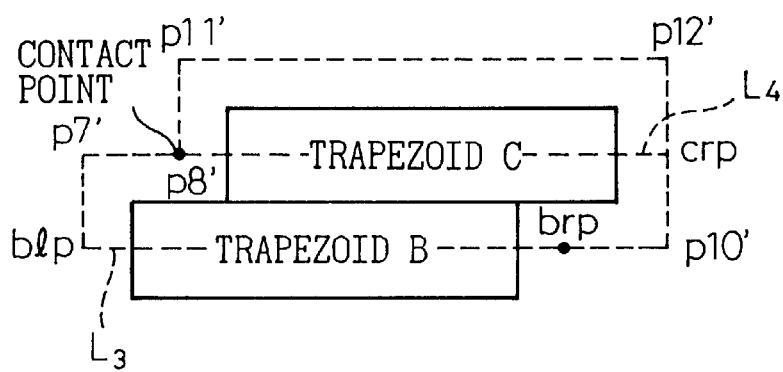

As shown in FIG. 5(d), in the case of horizontal trapezoid C, parallel line $L_3$ drawn from division point blp first crosses the segment (p10', p9') in the new first group of segments at the point brp (=p9'). Parallel line $L_4$ drawn from the contact point p8' crosses the segment (p12', p10') in the new first group of segment at the point crp. Therefore, horizontal trapezoid $C_1'$, which is encircled by the two parallel lines $L_3$ and $_4$, the new second group of segments (blp, p7') and (p7', p8') and the new first group of segments (crp, p10') and (p10', brp), and horizontal trapezoid $C_2'$, which is encircled by the parallel lines and the new first group of segments (p8', p1'), (p11', p12') and (p12', crp) are created. These horizontal trapezoid $C_1'$ and horizontal trapezoid $C_2'$ are stored as new horizontal trapezoid.

Next, in the seventh step, in the case where the objective horizontal trapezoid is horizontal trapezoid C, it is detected that no upper horizontal trapezoid exists. That is, processing has been completed with respect to all the horizontal trapezoids composing polygon P. Therefore, the resizing processing is finished.

Figure 6:
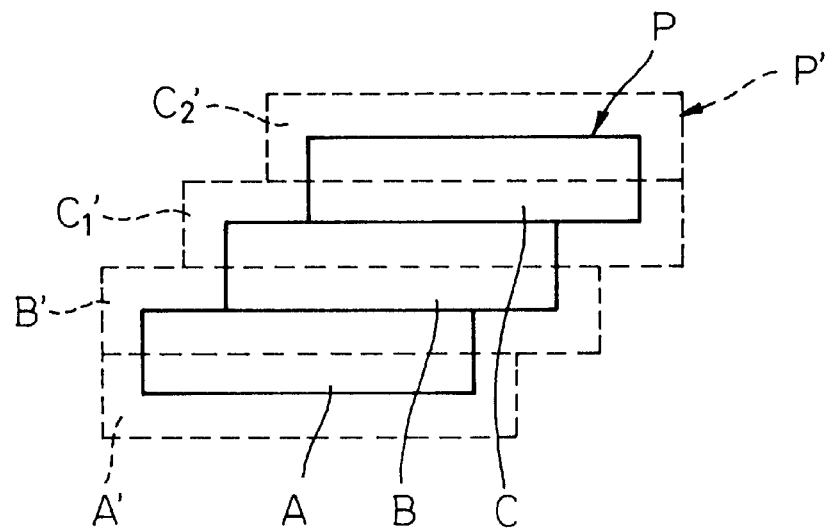
FIG. 6 is a schematic illustration showing a structure of enlarged figure P' obtained when enlarging processing (resizing processing) is conducted on polygon P.
Figure 7:
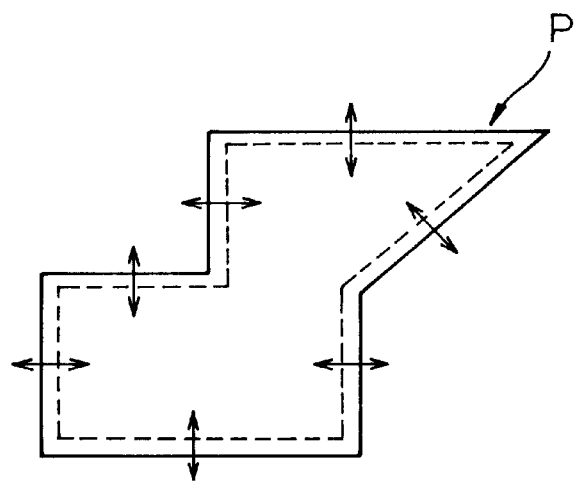
FIG. 7 is a schematic illustration for explaining a concept of resizing processing with respect to a polygon.
Figure 8:
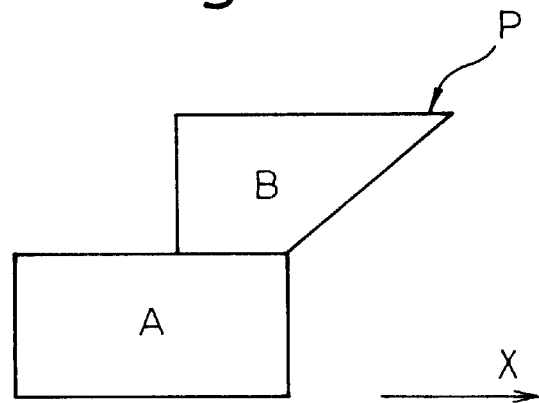
FIG. 8 is a view of a polygon, but the particular of the polygon shown in FIG. 7 is not illustrated.
Figure 9:
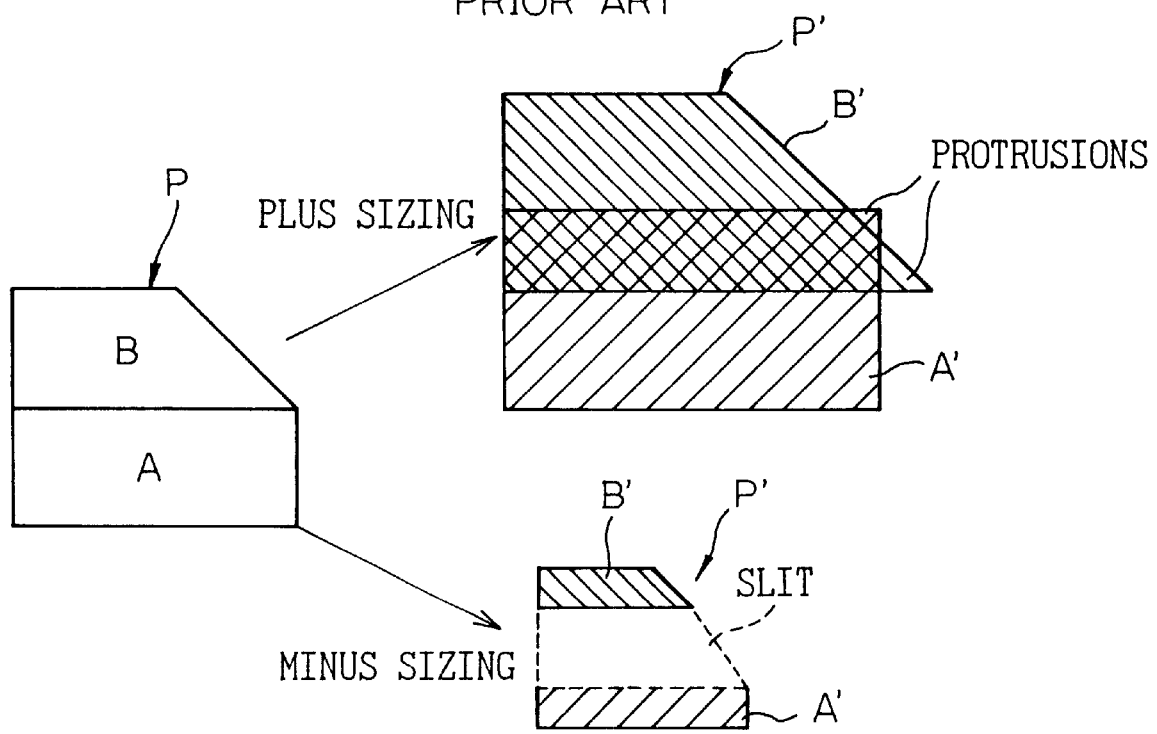
FIG. 9 is a schematic illustration for explaining inconvenience of the conventional resizing processing of a polygon.

According to the above method of processing a figure, it is possible to conduct the processing of resizing on polygon P without synthesizing three horizontal trapezoids A, B and C composing polygon P, which is unlike the conventional method of processing a figure, and it is possible to obtain a plurality of new horizontal trapezoids composing a resized polygon. In other words, horizontal trapezoids A', B', $C_1'$ and $C_2'$ can be created as new horizontal trapezoids composing enlarged figure P' of polygon P as shown in FIG. 6.

IN THE CASE OF OBTAINING A REDUCED FIGURE

Next, explanations will be made into a case in which a reduced figure of a polygon is obtained.

Essentially, this case is the same as the case in which an enlarged figure is obtained. Only the different points will be explained here.

Except for the third step, the other steps are the same as those of the case in which an enlarged figure is obtained.

In the third step, since polygon P is reduced, the first, the second and the third group of segments are reduced, they are respectively moved inside polygon P in parallel. After the movements have been completed, the segments located outside polygon P are removed on the basis of the cross points of the segments composing the groups of segments which have been moved in parallel. Corresponding to the groups of segments, the new first, the new second and the new third group of segments are created.

The preferred embodiments of the present invention are explained above. However, it should be noted that the present invention is not limited to the above specific embodiments, and variations may be made by one skilled in the art without departing from the spirit and scope of the present invention.

What is claimed is:

1. A method of processing a figure for obtaining an enlarged figure or a reduced figure by moving the sides of a polygon, which is composed by putting a plurality of horizontal trapezoids upon each other, each of the trapezoids having upper and lower sides parallel to an X-axis, in the direction of a Y-axis to the outside or inside of the polygon in parallel with each other, the method of processing a figure comprising the steps of:
selecting horizontal trapezoids one by one along Y axis out of the plurality of horizontal trapezoids as an objective horizontal trapezoid;

extracting a first group of segments included in the sides composing the objective horizontal trapezoid and also composing the sides of the polygon, also extracting a second group of segments included in an upper side and right and left sides of a lower horizontal trapezoid and composing the sides of the polygon if there is such a lower horizontal trapezoid coming into contact with the lower side of the objective horizontal trapezoid, also extracting a third group of segments included in the side of an upper horizontal trapezoid which is a side coming into contact with the objective horizontal trapezoid and composing the sides of the polygon if there is such an upper horizontal trapezoid coming into contact with an upper side of the objective horizontal trapezoid;

creating a new first group of segments, a new second group of segments and a new third group of segments, if the first group of segments, the second group of segments and the third group of segments are respectively moved to the outside or inside of the polygon in parallel with each other and also if an extension line located outside the polygon or a segment after the completion of movement is removed on the basis of an intersection point of the extension line of the segment composing each group of segments which has been moved in parallel or on the basis of an intersection, point of the segment composing each group of segments which has been moved in parallel;

removing the new third group of segments after the intersection point of the new first group of segments and the new second group of segments and the intersection point of the new first group of segments and the new third group of segments are stored as contact points and also removing the new second group of segments on the lower side of a division point if the predetermined division point exists on the new second group of segments;

sorting the contact point and the division point in the order of the Y coordinate value and the X coordinate value under the condition that priority is given to Y coordinate value;

drawing parallel lines parallel to the X-axis from the contact point and the division point in the order of sorting to the inside of the polygon while it is detected whether or not points of intersection exist between the new second group of segments and the parallel line or between the new first group of segments and the parallel line and also making a horizontal trapezoid encircled by the parallel line, the new first group of segments and the new second group of segments to be a new horizontal trapezoid composing the enlarged figure or the reduced figure if the points of intersection exist; and storing the contact point and the point of intersection included in the parallel line, the Y-coordinate value of which is the highest in the parallel line on which the point of intersection exists, instead of the division point if the upper horizontal trapezoid exists.

2. A recorded medium having instructions thereon for processing a figure for obtaining an enlarged figure or a reduced figure by moving the sides of a polygon, which is composed by putting a plurality of horizontal trapezoids upon each other, each of the trapezoids having upper and lower sides parallel to X-axis, in the direction of Y-axis to the outside or inside of the polygon is parallel with each other, said recorded medium having instructions thereon operating a computer performing the steps of:

selecting the horizontal trapezoid one by one along Y-axis out of the plurality of horizontal trapezoids as an objective horizon trapezoid;

extracting a first group of segments included in the sides composing the objective horizontal trapezoid and also composing the sides of the polygon, also extracting a second group of segments included in an upper side and right and left sides of a lower horizontal trapezoid and composing the sides of the polygon if there is such a lower horizontal trapezoid coming into contact with the lower side of the objective horizontal trapezoid, also extracting a third group of segments included in the side of an upper horizontal trapezoid which is a side coming into contact with the objective horizontal trapezoid and composing the sides of the polygon if there is such an upper horizontal trapezoid coming into contact with an upper side of the objective horizontal trapezoid;

creating a new first group of segments, a new second group of segments and a new third group of segments, if the first group of segments, the second group of segments and the third group of segments are respectively moved to the outside or inside of the polygon in parallel with each other and also if an extension line located outside the polygon or a segment after the completion of movement is removed on the basis of an intersection point of the extension line of the segment composing each group of segments which has been moved in parallel or on the basis of an intersection point of the segment composing each group of segments which has been moved in parallel;

removing the new third group of segments after the intersection point of the new first group of segments and the new second group of segments and the intersection point of the new first group of segments and the new third group of segments are stored as contact points and also removing the new second group of segments on the lower side of a division point if the predetermined division point exists on the new second group of segments;

sorting the contact point and the division point in the order of the Y coordinate value and the X coordinate value under the condition that priority is given to Y coordinate value;

drawing parallel lines parallel to the X-axis from the contact point and the division point in the order of sorting to the inside of the polygon while it is being detected whether or not points of intersection exist between the new second group of segments and the parallel line or between the new first group of segments and the parallel line and also making a horizontal trapezoid encircled by the parallel line, the new first group of segments and the new second group of segments to be a new horizontal trapezoid composing the enlarged figure or the reduced figure if the points of intersection exist; and storing the contact point and the point of intersection included in the parallel line, the Y-coordinate value of which is the highest in the parallel line on which the point of intersection exists, instead of the division point if the upper horizontal trapezoid exists.

3. The method of claim 1 wherein the figure is part of a mask pattern.

4. The method of claim 3 wherein the mask pattern comprises a plurality of figures, and wherein the method includes the step of composing the horizontal trapezoids into a polygon after processing the plurality of figures to obtain a reduced figures or an enlarged figure.

5. The recorded medium of claim 2 wherein the figure is part of a mask pattern.

6. The recorded medium of claim 5 wherein the mask pattern comprises a plurality of figures, and wherein the instructions includes the step of composing the horizontal trapezoids into a polygon after processing the plurality of figures to obtain a reduced figures or an enlarged figures.

* * * * *